INVENTORS.
ARTHUR C. CONDODINA,
IGNATIUS J. NIEMKIEWICZ &
MARVIN S. SHINBAUM
BY *Meyer, Tilberry & Body*
ATTORNEYS

United States Patent Office 3,428,275
Patented Feb. 18, 1969

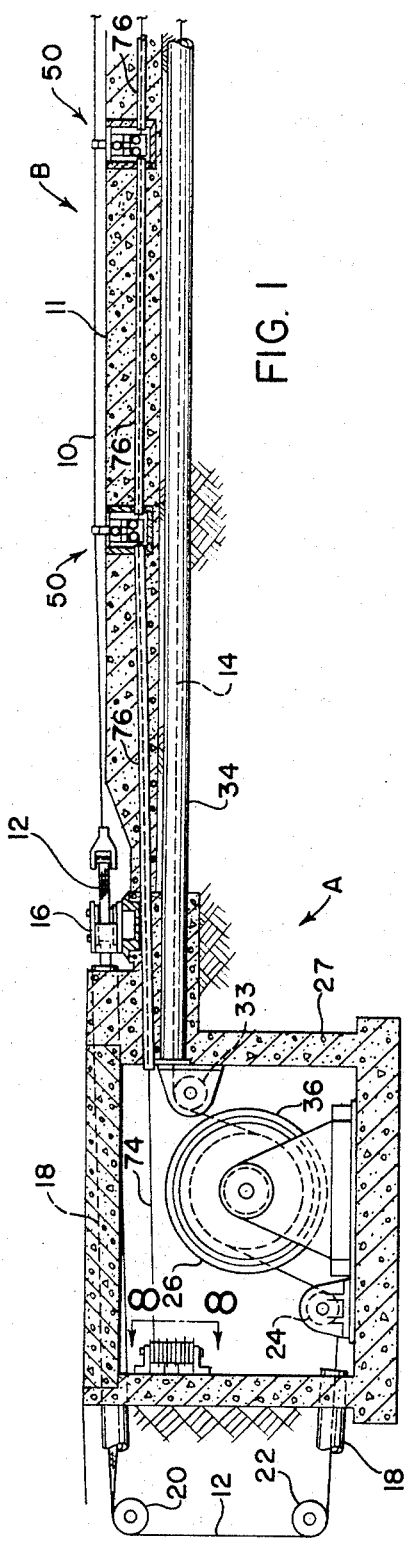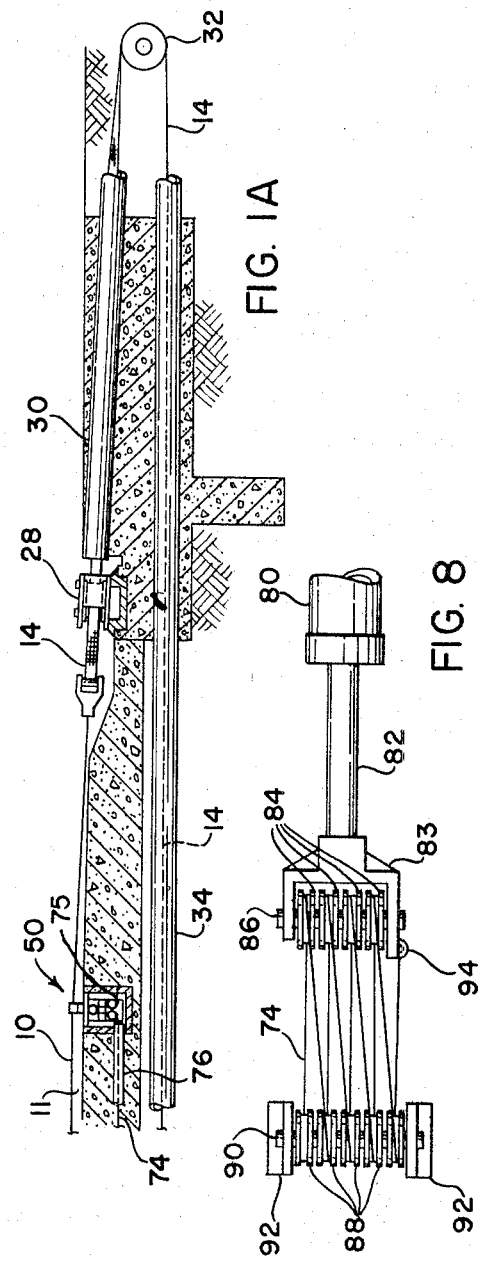

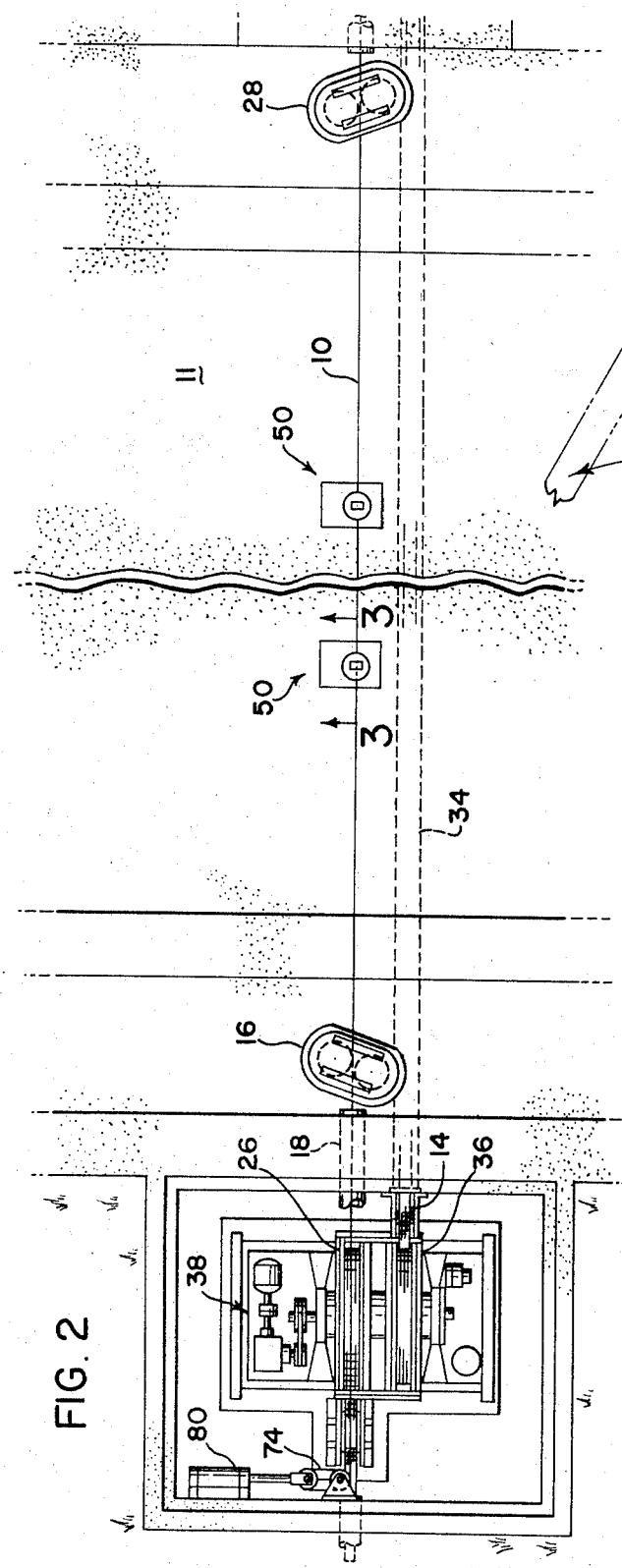

3,428,275
SUPPORT APPARATUS FOR ARRESTING
GEAR CABLE
Arthur C. Condodina, Philadelphia, Pa., Ignatius J. Niemkiewicz, Wilmington, Del., and Marvin S. Shinbaum, Springfield, Pa., assignors to E. W. Bliss Company, Canton, Ohio, a corporation of Delaware
Filed Mar. 28, 1967, Ser. No. 626,561
U.S. Cl. 244—110                                    8 Claims
Int. Cl. B64c 25/68; B64f 1/02

ABSTRACT OF THE DISCLOSURE

A support system for supporting an arresting gear cable transversely of a runway and at a desired distance thereabove. The system includes a plurality of individual support units positioned at spaced locations transversely of the runway. Each unit includes a cable support member spring biased to a "cable raised" position. The units are interconnected by a mechanical drive train which functions to selectively move all the support members simultaneously to a "cable lowered" position. The drive train comprises a first sheave carried on each support member and a pair of sheaves fixedly positioned therebelow. A drive cable passes successively through each unit and around the sheaves therein. One end of the drive cable is anchored and the other end is connected to the piston of an air cylinder. Actuation of the cylinder to pull in the drive cable causes the support members to be moved to the "cable lowered" position against the bias of the springs.

---

The present invention is directed toward the vehicle arresting art and more particularly to an apparatus for supporting a vehicle arresting pendant at a required elevation above a runway surface.

The invention is particularly applicable for use in conjunction with an aircraft arresting system, and it will be described with particular reference thereto; however, it is appreciated the invention is capable of broader applications and could be used in many similar types of vehicle arresting systems.

Presently used aircraft arresting systems generally include an arresting cable, or pendant, which is positioned transversely of a normal runway for engaging an aircraft to be arrested. The opposite ends of the cable are connected onto energy absorbing and decelerating apparatus which apply a retarding and braking force to the cable for bringing the aircraft to rest.

The pendant must extend substantially across the runway; therefore, means must be provided for supporting the pendant at spaced locations. In this manner, the pendant is held above the runway for proper engagement by the aircraft. Additionally, because the pendant needs be supported in the raised position only intermittently, the support means must be capable of being lowered to bring the pendant into engagement with the runway surface or below this surface.

A number of different systems have been proposed to support an arresting gear pendant. Generally, these support systems have included a plurality of support units positioned across the runway. Each unit had a pendant support member biased into a raised position by inflatable bags or springs. Normally the support members were lowered from their biased position by a fluid actuator positioned adjacent each support unit. Consequently, all of these prior systems require the establishment and maintenance of a fluid line, such as a vacuum line or a pressure line, to each of the support units. Because of the high vibration environment present in the impact and arrest area of the runway, these lines are subject to substantial stress which may result in failure of the fluid lines. Additionally, these systems require the use of a plurality of individual support lowering actuators.

The present invention provides a pendant support system which overcomes the reliability problems present in the prior systems and permits a single actuator to control the raising and lowering of a plurality of support members.

In accordance with the present invention improved means are provided for simultaneously moving the pendant support members from their upper, biased, pendant raised position to their lower position. These improved means comprises a first element connected to the support members and movable therewith, and a mechanical drive train means serially interconnecting the first elements of each of the support members for simultaneously moving the support members against the biasing means to bring them to their lower position.

Accordingly, a primary object of the present invention is to provide an aircraft arresting pendant support system in which all of the individual support members are simultaneously actuated from a common mechanical drive train.

An additional object of the present invention is to provide an aircraft arresting pendant support system which is simply constructed and reliable in operation.

A further object of the present invention is the provision of a pendant support system which permits a single actuator to control the movement of a plurality of pendant support members.

Another object of the present invention is the provision of a pendant support system which eliminates the need for runway mounted vacuum or gas lines.

These and other objects and advantages will become apparent from the following description used to illustrate a preferred embodiment of the present invention when read in conjunction with the accompanying drawings wherein:

FIGURE 1 is a partial elevational view showing the left end of an arresting system having a pendant support system constructed in accordance with the present invention;

FIGURE 1A shows the right hand end of the system shown in FIGURE 1;

FIGURE 2 is a plan view of the system shown in FIGURES 1 and 1A;

FIGURES 6 and 7 are pictorial views of the pendant supporting element in its pendant holding and releasing conditions respectively; and FIGURE 8 is an enlarged view taken on line 8—8 of FIGURE 1 and showing in detail the actuator mechanism utilized.

Figure 5:
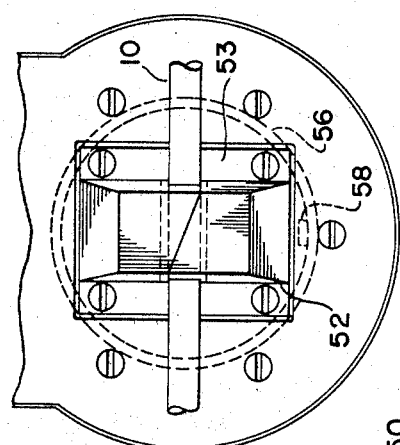
FIGURE 5 is a plan view of the pendant support unit of FIGURES 3 and 4.

Referring now to the drawings wherein the showings are for the purpose of illustrating a preferred embodiment of the invention only and not for the purpose of limiting same, FIGURES 1, 1A and 2 show the overall arrangement of an aircraft arresting system A provided with a pendant support system B constructed in accordance with a preferred embodiment of the present invention.

The specific arrangement and construction of the aircraft arresting system A is not important to the present invention and could, for example, be constructed as shown in United States Patent 3,142,458 to Byrne et al. Briefly, the particular arrangement shown in the drawings comprises an aircraft engaging cable or pendant 10 which extends transversely of the runway 11 and is connected at its opposite ends to heavy belts or tapes 12 and 14 which are formed from a synthetic material such as nylon. Tape 12 extends through guide sheaves 16 and a conduit 18 around sheaves 20, 22 and 24 into engagement with a tape reel 26 which is mounted for rotation in a pit 27 formed at the side of the runway. Tape 14 likewise passes over a pair of guide sheaves 28 and through a conduit 30 and around a sheave 32. The tape 14 is then conducted back under the runway through a conduit 34 and over a sheave 33 into engagement with a second tape reel 36 also mounted in pit 27.

Reels 26 and 36 are provided with heavy duty brakes not shown which function to apply the necessary braking force to arrest and stop an aircraft which has engaged pendant section 10 and caused unwinding of the tapes 12 and 14 from the reels. Apparatus indicated generally with reference numeral 38 (see FIGURE 2) is also provided to rewind the tapes and return the pendant to its aircraft arresting position.

As can be seen from FIGURES 1 and 1A pendant section 10 is of substantial length and must be supported at spaced points therealong to maintain it in proper position for contacting the engaging means on an aircraft to be arrested. Additionally, since these systems are generally used only for arresting distressed aircraft, the pendant needs to be in its raised position only intermittently. For this reason, means are provided to lower the pendant into engagement with the runway surface during the periods when it is not being used for performing its arresting function.

Figure 4:
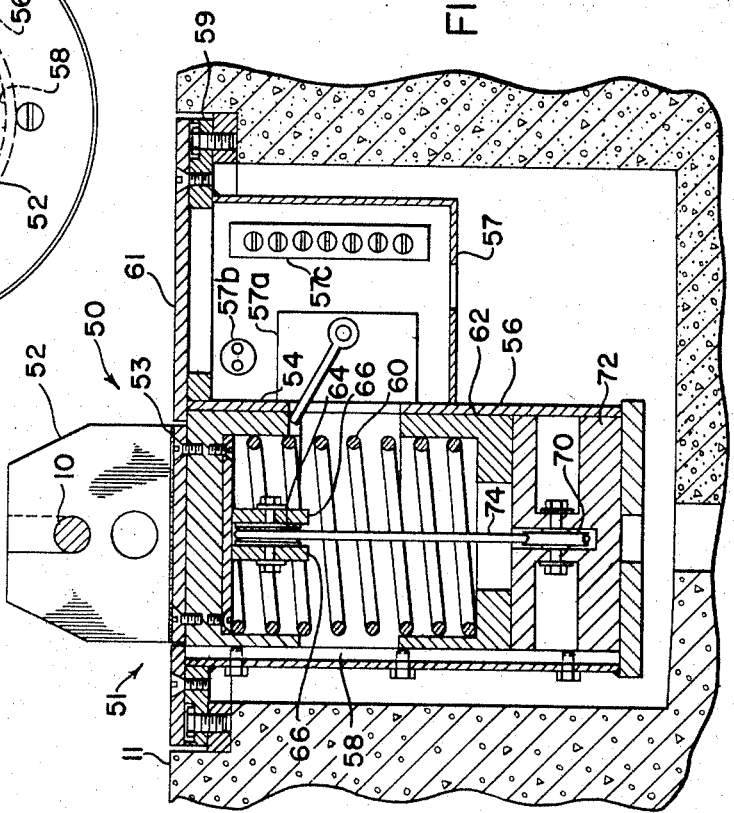
FIGURE 4 is a cross-sectional view taken on line 4—4 of FIGURE 3.
Figure 3:
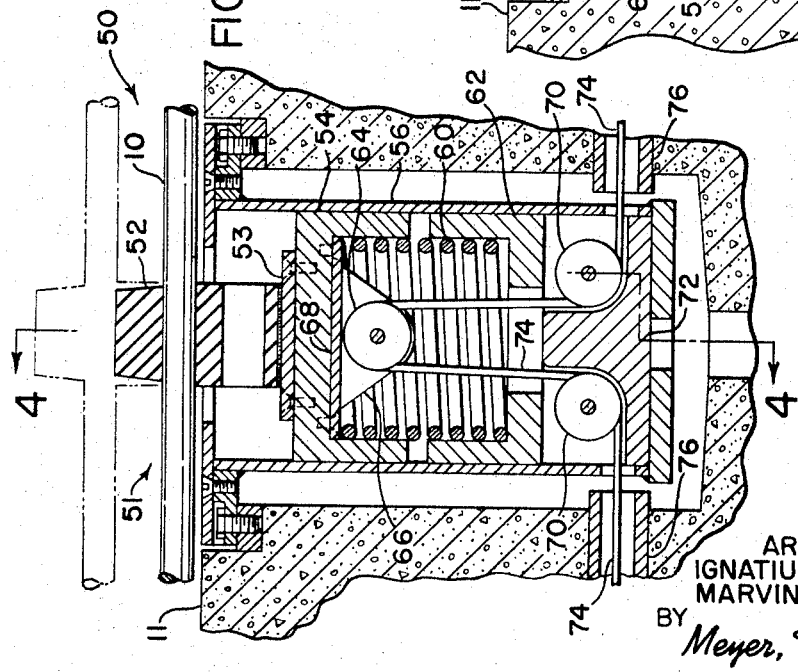
FIGURE 3 is a cross-sectional view taken on line 3—3 of FIGURE 2 and showing the internal details of the pendant support units.

The particular means provided for supporting pendant section 10 comprise a plurality of support units 50 which are positioned at spaced locations transversely of the runway. The units can be built directly into the runway or mounted in precast concrete boxes installed flush with the runway surface. As best shown in FIGURES 3-5 each of the support units 50 comprises a support member 51 which is mounted for movement between a lower position shown by solid lines in FIGUURE 3, and an upper position shown by dotted lines in FIGURE 3 and solid lines in FIGURE 4.

Each of the support members 51 includes a pendant holding element 52 formed from a block of rubber or rubber-like resilient material such as neoprene or adiprene. Elements 52 are best shown in FIGURES 6 and 7. As shown, the elements have a transversely extending pendant receiving opening 52a sized to receive the pendant 10. A diagonal slit 52b extends down from the top surface of the element to the opening 52a. This arrangement permits the element to normally hold the pendant securely until the pendant is engaged by an aircraft. At that time the element will deform generally as shown in FIGURE 7 and release the pendant.

As shown in FIGURES 3 and 4, element 52 is bonded or otherwise connected to a plate 53 which is screwed to an element 54 shown in the form of a piston mounted for reciprocating motion in a housing or cylinder 56. A second smaller housing 57 is connected to the side of housing 56 and provides a chamber for containing any desired auxiliary equipment such as heaters, position indicator switch 57a, heating control thermostat 57b and electrical terminal block 57c. As shown, the upper edge of the housings 57 and 56 are provided with a mounting flange 59 arranged to permit the top surface of the unit to be mounted flush with the surface of runway 11. The top ends of the housings are closed by a plate 61 connected by screws to flange 59.

In order to prevent the piston 54 from rotating in the housing 56, a vertically extending key member 58 is screwed or otherwise connected to the internal wall of the housing and slidingly engages a slot formed in the side of the piston. A helical coil spring 60 is provided to normally maintain the support member 51 in its upper or pendant raised position. The lower end of the spring is carried by a generally cup-shaped member 62 mounted in the lower section of the housing 56.

Of particular importance to the present invention is the drive means provided to simultaneously move all of the support members 51 to their lower position against the bias of their springs 60. This drive means could take a variety of forms; however, according to the preferred embodiment it includes a plurality of elements in the form of pulleys or sheaves 64, one of which is carried by each of the pistons 54 by brackets 66 which are welded to plates 68 screwed to the underside of pistons 54. The drive also includes pairs of sheaves 70 which are mounted in members 72 positioned subjacent the piston and fixedly mounted in the cylinders 56.

In order to simultaneously move all of the support members 51 downwardly, the drive means includes an elongated tension member, shown as a steel cable 74, fixedly connected at its right end 75 to the wall of the rightmost support unit 50 (see FIGURE 1A) and then passed successively through each of the support units. As the cable passes through each support unit it first passes under the right hand sheave 70 and up and over the upper sheave 64 connected to the piston. The cable then passes back under the left of the lower sheaves 70 and is conducted through a conduit 76 to the next adjacent support unit. As is apparent, with the cable interconnecting the support units in the manner described, a tension force applied to the left end of the cable causes all of the support members 51 to be simultaneously moved to their lower position. In this manner, all of the support units are mechanically interconnected and the previously required air or hydraulic lines eliminated.

A variety of means could be utilized to provide the necessary tensioning force to the end of member 74. As shown in FIGURES 1 and 8 however, according to the preferred embodiment the means utilized comprises an air cylinder 80 having a piston rod 82 extending therefrom. A bracket 83 is mounted on the end of the piston rod and carries a plurality of sheaves 84 which are rotatably mounted on a shaft 86 carried by the bracket. A second group of sheaves 88 are carried on a shaft 90 supported from the wall of the pit 27 by a pair of brackets 92. The left end of tension member 74 is successively reeved about the pulleys 88 and 84 and attached to the movable bracket 83 at point 94. This arrangement provides a multiplication of the movement of piston rod 82. Consequently, actuation of cylinder 80 to move the piston rod to the right causes a substantial length of cable to be pulled in thereby moving all of the support members to their lowered position. Any particular type of control either manual or automatic could be provided to control the actuation of cylinder 80. Likewise, any convenient source of pressurized air, such as compressed air cylinders or a small compressor and accumulator, could be provided.

As is readily apparent, the above-described pendent support system is extremely simple and provides complete mechanical interconnection of all the support units. Additionally, as is apparent, failure of the cable or the actuator will result in the support members moving to their upper position under the bias of springs 60. Consequently, the system is inherently fail safe. Further, the system eliminates the need for individual actuators at each of the support units, as well as the undesirable runway installed air or hydraulic lines.

The invention has been described in great detail sufficient to enable one of ordinary skill in the arresting gear art to practice the invention. Obviously modifications and alterations of the preferred embodiment will occur to others upon a reading and understanding of the specification.

Having thus described our invention, we claim:

1. In a runway mounted vehicle arresting system having a vehicle engaging member extending transversely of the runway and supported by a plurality of support members movable in first and second directions between a first position which places said engaging member in vehicle engaging position and a second position which places said engaging member in a nonengaging position, and wherein each of said support members includes means for biasing said support member to said first position, the improvement comprising: each of said support members having a first element connected thereto and movable therewith, a movable mechanical drive train means serially interconnecting said first elements of each of said support members for simultaneously moving said support members against said biasing means to said second position, and power means for selectively moving and subjacent said support members.

2. The improvement as defined in claim 1 wherein said drive train means includes an elongated flexible tension member drivingly engaged with each of said first elements.

3. The improvement as defined in claim 1 wherein said drive train means extends transversely of said runway and subjacent said support members.

4. The improvement as defined in claim 1 wherein said drive train means includes second elements fixedly positioned relative said first elements, and an elongated flexible tension member in engagement with all of said first and second elements.

5. The improvement as defined in claim 4 wherein said first and second elements comprise sheaves about which said tension member passes in serial order.

6. The improvement as defined in claim 4 including means for applying a tensioning force to said tension member.

7. The improvement as defined in claim 4 wherein one end of said tension member is fixed and said other end is connected to means for applying a tension force.

8. The improvement as defined in claim 4 wherein said tension member comprises a cable extending transversely of said runway.

References Cited

UNITED STATES PATENTS

| 3,146,974 | 9/1964 | Petoia | 244—110 |
| 3,167,277 | 1/1965 | Cotton | 244—110 |

FOREIGN PATENTS

| 935,277 | 8/1963 | Great Britain. |

MILTON BUCHLER, *Primary Examiner.*

PAUL E. SAUBERER, *Assistant Examiner.*